US008015408B2

(12) United States Patent  
Movva et al.

(10) Patent No.: US 8,015,408 B2  
(45) Date of Patent: Sep. 6, 2011

(54) TRUST EVALUATION FOR A MOBILE SOFTWARE AGENT ON A TRUSTED COMPUTING PLATFORM

(75) Inventors: Sasidhar Movva, Wheatley Heights, NY (US); Richard Dan Herschaft, Whitestone, NY (US); Inhyok Cha, Yardley, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 993 days.

(21) Appl. No.: 11/733,536

(22) Filed: Apr. 10, 2007

(65) Prior Publication Data

US 2008/0072287 A1 Mar. 20, 2008

Related U.S. Application Data

(60) Provisional application No. 60/825,685, filed on Sep. 14, 2006.

(51) Int. Cl.
*H04L 9/32* (2006.01)
(52) U.S. Cl. ........................................ 713/169; 455/419
(58) Field of Classification Search ........................ None
See application file for complete search history.

(56) References Cited

U.S. PATENT DOCUMENTS

| | | | | |
|---|---|---|---|---|
| 7,103,771 | B2 * | 9/2006 | Grawrock | 713/155 |
| 2002/0144139 | A1 * | 10/2002 | Ladwig | 713/200 |
| 2005/0216736 | A1 * | 9/2005 | Smith | 713/168 |
| 2005/0246552 | A1 * | 11/2005 | Bade et al. | 713/193 |
| 2007/0226786 | A1 * | 9/2007 | Berger et al. | 726/9 |
| 2007/0300069 | A1 * | 12/2007 | Rozas | 713/176 |

OTHER PUBLICATIONS

Wayne Jansen Mobile Agents and Security Canadian Information Technology Security Symposium May 1999.*
Pridgen et al. A Secure Modular Mobile Agent System SELMAS '06, Shanghai, China May 22-23, 2006.*
IBM Research, "Virtual Trusted Platform Module", Downloaded from http://domino.research.ibm.com/comm/research_projects.nsf/pages/ssd_vtpm.index.html, (Last Updated May 2, 2006).
IBM, "TPM Main Part 3 IBM Commands", Specification Version 1.2, Revision 10, (Apr. 25, 2005).
Pearson, "Trusted Computing Platforms", TCPA Technology In Context, Hewlett-Packard Company, Prentice Hall, (2003).
Trusted Computing Group, "Mobile Phone Working Group", Use Case Scenarios—V2.7, (2005).
Trusted Computing Group, "Securing The Enterprise", Seminar Presentation, (2006).
Trusted Computing Group, "TCG Mobile Trusted Module Specification", Specification Version 1.0, Revision 1, (Jun. 12, 2007).
Trusted Computing Group, "TCG Virtualized Trusted Platform White Paper", Version 1.00, Working Draft, Revision 0.12, (May 9, 2006).
Trusted Computing Group, "TPM Main Part 1 Design Principles", Specification Version 1.2, Revision 85, (Feb. 13, 2005).

* cited by examiner

*Primary Examiner* — David J Pearson
(74) *Attorney, Agent, or Firm* — Woodcock Washburn LLP

(57) ABSTRACT

A method and system for performing trust evaluation for a mobile software agent on a trusted computing platform are disclosed. A sending entity, which includes a mobile software agent, verifies if a receiving entity is trustworthy before transferring the mobile software agent to the receiving entity. The receiving entity may verify the state and details of the mobile software agent and/or the state of the sending entity, and receive the mobile software agent if the state of the mobile software agent and the sending entity are trustworthy. The mobile software agent may include its own virtual trusted platform module (TPM) which is tied to an agent's identity. The agent's virtual TPM is part of the agent and transferred along with the mobile code when the mobile code is transferred.

39 Claims, 3 Drawing Sheets

TRUST EVALUATION FOR A MOBILE SOFTWARE AGENT ON A TRUSTED COMPUTING PLATFORM

CROSS REFERENCE TO RELATED APPLICATION

This application claims the benefit of U.S. Provisional Application No. 60/825,685 filed Sep. 14, 2006, which is incorporated by reference as if fully set forth.

FIELD OF INVENTION

The present invention is related to data security. More particularly, the present invention is related to a method and system for performing trust evaluation for a mobile software agent on a trusted computing platform.

BACKGROUND

Mobile software agents at the basic level contain code, state information and data. Mobile software agents are similar to any other software program, with the exception that they can move from one system to another and execute locally on a remote system. A mobile software agent may be executed on many systems during its life cycle. In some instances, mobile software agents may work under the control of a central entity that provides inputs to the agents. In other instances, the agents may be autonomous and independently make decisions.

Conventional software agents have some long-standing problems. When an agent is moved to a remote system, there is currently no mechanism for the agent to decide if the remote system is trustworthy. There are some solutions that make use of digital certificates to verify the identity of the remote system. However, there is no mechanism for verifying the trustworthiness of the remote system.

When a computer accepts a mobile software agent, it has to make sure that the code of the mobile software agent is not malicious in nature. A conventional approach involves a signed code that the remote entity can use to verify that the code is authentic. However, no mechanism exists for verifying whether the state of the agent and the data transmitted along with the agent are trustworthy.

When a computer downloads a mobile software agent, it has to make sure that the system that it needs to interact with to import a code is not malicious in nature. Conventional solutions used to ensure that the agent and the platform are trustworthy use digital certificates and limit the resources available to the agent on the remote system, (e.g., sandboxing). Use of digital certificates will help identify the code and the platform, but does not provide any indication of how trustworthy the platform is at the given point in time. Restricting access to resources will help make the receiving entity more secure, but it limits the functionality that the agent can support. In addition, this does not prevent a malicious code from being imported or operating on the remote system, but it merely reduces the extent of the potential damage a code may do after it is imported. Moreover, this method reduces but does not quite eliminate the possibility that the imported code damages a receiving system.

Trusted Computing Group (TCG) is an organization established with an aim of enhancing security of the computing environment in disparate computer platforms. TCG has adopted specifications developed by the trusted computing platform alliance. At the root of the TCG specifications is a tamper resistant security hardware device embedded in the platform, which is called the trusted platform module (TPM). The TPM acts as a "root of trust" for the platform, and has integrated cryptographic functionality providing integrity, creation and use of digital signatures and privacy protecting mechanisms. A platform configuration register (PCR) is a 20-byte storage area, internal to the TPM, which contains a cumulative digest of a number of measured values, typically consisting of embedded data. The TCG specification mandates that there be at least sixteen PCRs within a TPM.

Integrity reporting may be used to determine a platform's current configuration. FIG. 1 shows a conventional attestation procedure 150 for a system 100 having a TPM 106. A challenger 102 requests one or more PCR values from a platform agent 104 (step 152). The platform agent collects stored measurement log (SML) entries, which are integrity measurement values (step 154). The platform agent 104 requests PCR values from the TPM 106 (step 156). The PCR values are measurement digests of the integrity measurement values, (i.e., signed hash of the integrity measurement values). The TPM 106 signs the PCR values using an attestation identity key (AIK) (step 158), and sends it to the platform agent 104 (step 160). The platform agent 104 also collects credentials that vouch for the TPM 106 from the repository 108 (steps 162, 164). The platform agent 104 sends the signed PCR values, the SML entries and the credentials to the challenger (step 166). The challenger 102 then verifies the platform configuration (step 168). For the verification, the challenger 102 computes a measurement digest from the received SML entries and compares the computed measurement digest with the PCR values. The challenger 102 also evaluates the platform credentials and checks signatures.

Recently, methods to virtualize the functions of a physical TPM have been proposed. Using these methods, a single physical TPM can be used on systems where multiple operating systems are running concurrently or multiple software and hardware sub-entities on the system can take on functions of 'virtualized', 'instantiated' TPM using the single physical TPM on board. TPMs typically provide singular instances of features, such as endorsement and storage root key pairs, TPM owner, one set of PCRs and other singletons, with existing TPM-based security architectures having been built around these features.

From its inception, the current TPM was not designed to be accessed by multiple systems at the same time. Therefore, a virtual TPM that can work with multiple operating systems on the same machine would need extended command sets that are new to the current TPM v1.2 commands.

In one proposed virtual TPM model, each created instance of a TPM holds an association with a virtual machine (VM) throughout its lifetime on the platform. As modern hypervisors also allow for the migration of operating system VMs from one physical machine to another, a virtual TPM implementation must support migration of the TPM state. Prior art methods allow, (using extended virtual TPM command sets), TPM state migration such that the complete state of the TPM is secured throughout the transition, based on migratable storage keys that are shared between the involved systems.

SUMMARY

The present invention is related to a method and system for performing trust evaluation for a mobile software agent on a trusted computing platform. A sending entity, which includes a mobile software agent, verifies if a receiving entity is trustworthy before transferring the mobile software agent to the receiving entity. The receiving entity may also verify the state and details of the mobile software agent and/or the state of the sending entity, and receive the mobile software agent if the state of the mobile software agent and the sending entity are trustworthy. The mobile software agent may include its own virtual TPM which is tied to an agent's identity. The agent's virtual TPM is part of the agent and transferred along with the mobile code when the mobile code is transferred.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "sending entity" refers to a computer or a system where a software agent is currently residing and is sending the software agent to a receiving entity. When referred to hereafter, the terminology "receiving entity" refers to a computer or a system that is willing to receive the software agent. A sending entity at a given instance may be a receiving entity at a different instance or for a different agent.

Figure 1:
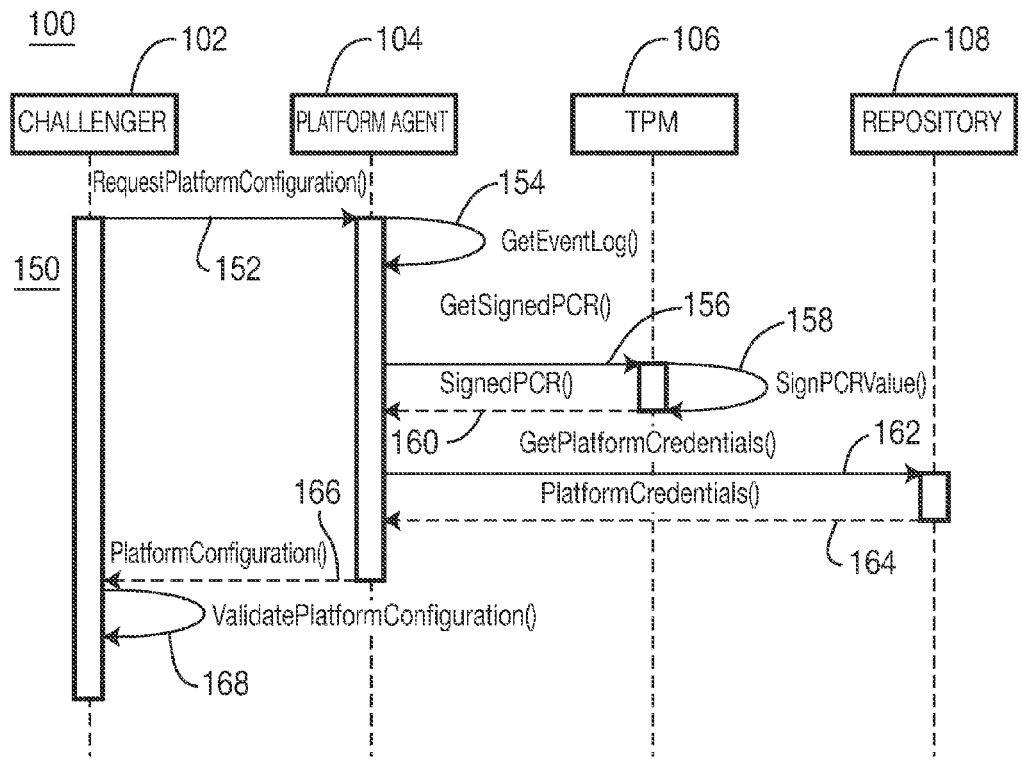
FIG. 1 shows a conventional attestation procedure for a system including a TPM.
Figure 2:
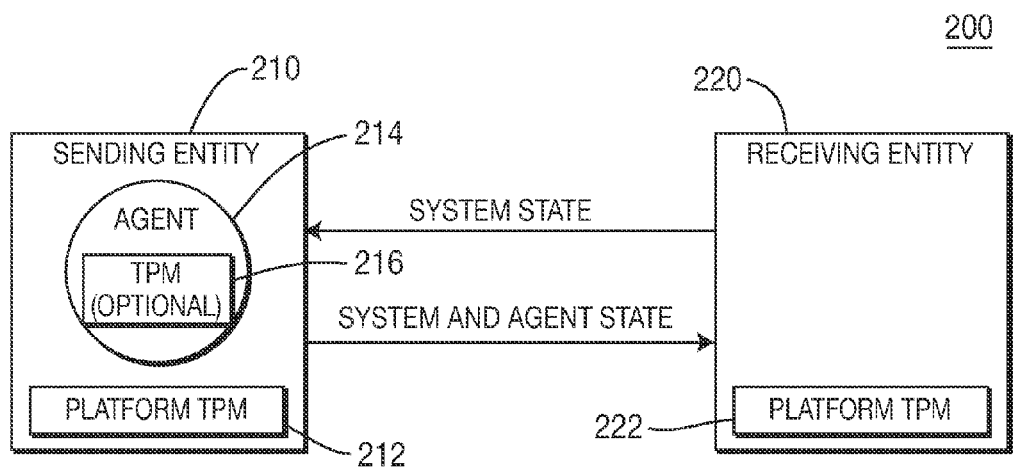
FIG. 2 shows a system for trust evaluation for a mobile software agent on a trusted computing platform in accordance with the present invention.

FIG. 2 shows a system 200 for performing trust evaluation for a mobile software agent on a trusted computing platform in accordance with the present invention. The system 200 includes a sending entity 210 and a receiving entity 220. The sending entity 210 includes a platform TPM 212 and a software agent 214. The receiving entity 220 includes a platform TPM 222. In accordance with the present invention, the sending entity 210 obtains system state information from the receiving entity and evaluates a state of the receiving entity 220 before sending the mobile software agent 214 to the receiving entity 220. The receiving entity 220 may obtain system and/or agent state information and evaluate a state of the sending entity 210 and/or a state of the mobile software agent 214 before receiving the mobile software agent 214.

The agent 214 may optionally include its own virtual TPM, (i.e., an agent TPM 216). The agent TPM 216 relies on the platform TPM 212 to provide services to other entities. As the agent TPM 216 is virtual in nature and the agent TPM 216 is part of the agent 214 itself, the agent TPM 216 is transferred along with the mobile agent 214 when the mobile agent 214 is transferred. If there is no virtual TPM in the sending entity 210, any AIKs used by the agent 214 would be tied to the platform TPM 212 on which the agent 214 is currently running. This would lead to recreating all the AIKs if the agent 214 moves from one platform to another. If an agent TPM 216 is included in the agent 214, and the information in the agent TPM 216 is tied to the agent's identity, not to the platform itself, there is no need to recreate AIKs after the transfer of the agent 214. This information may include identity keys, (i.e., AIKs), but these keys may be linked to the agent's ID, and not to the platform where the agent resides, (or previously resided). If the agent 214 has to move from one system to another, the agent 214 links its own identity to the identity of the new platform. In accordance with the present invention, the two "tying" links are separated. The first link is from the agent TPM, (i.e., virtual TPM within the agent itself), to the agent's ID, (only the agent's ID, not directly to the platform upon which the agent resides), and the second link is from the agent's ID to the platform. By separating these two links, one can eliminate the need for the agent TPM 216 to have to recreate any used AIKs when the agent 214 itself moves to a new platform.

Figure 3:
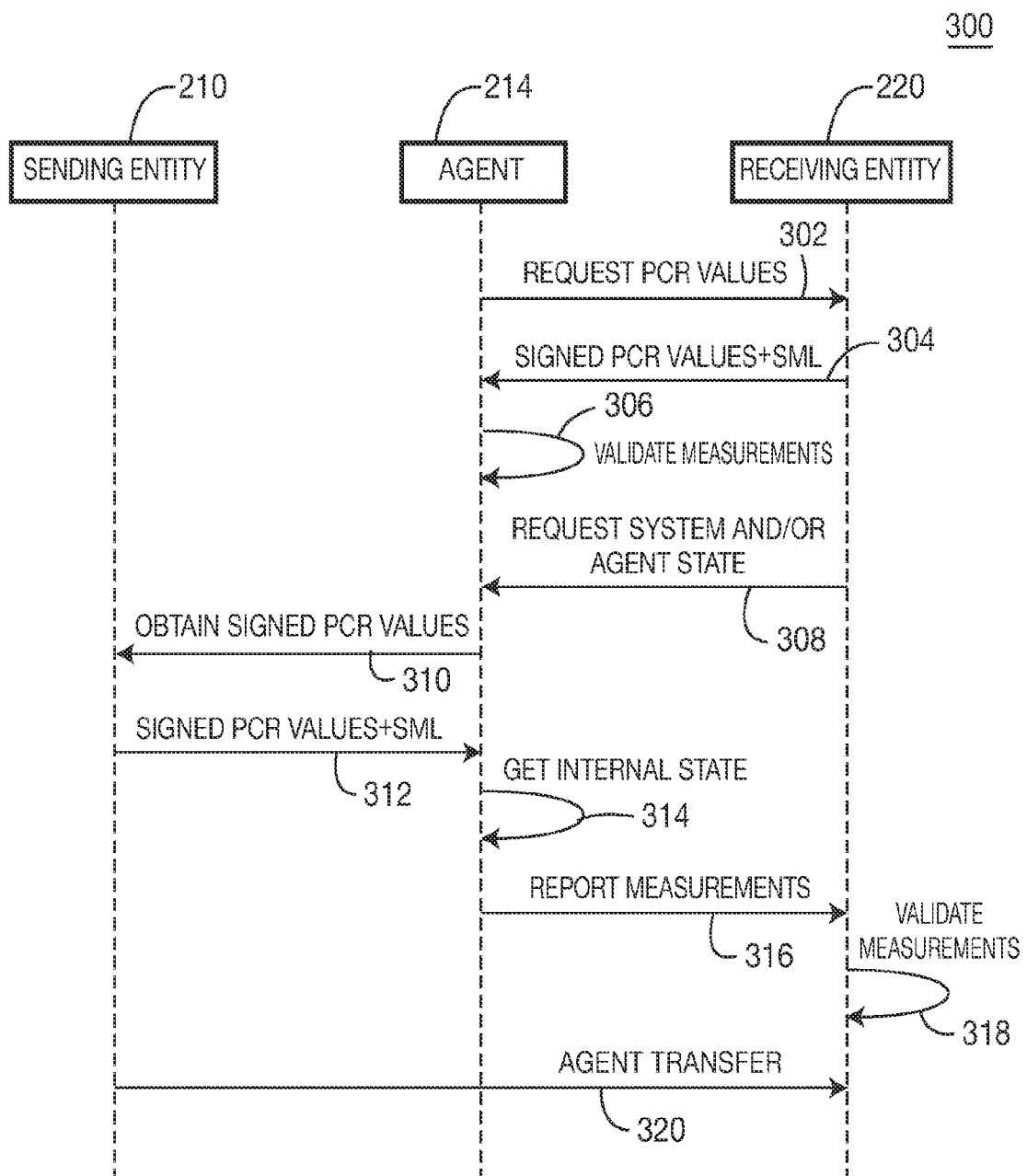
FIG. 3 is a signaling diagram of a trust establishment process in accordance with one embodiment of the present invention.

FIG. 3 is a signaling diagram of a trust establishment process 300 in accordance with one embodiment of the present invention. The sending entity 210 wishes to send its agent 214 to the receiving entity 220. The decision to transmit the agent 214 may be generated by the sending entity 210, the agent 214, a third party, the receiving agent 220 or any combination of these entities. Before the transfer of the agent 214, the sending entity 210 evaluates the trustworthiness of the receiving entity 220 preferably based on TCG attestation protocol. The agent 214 in the sending entity 210 requests the receiving entity 220 for its PCR value(s) and SML entries (step 302). The SML entries are integrity measurement values of the receiving entity 220 and the PCR value is a measurement digest of the integrity measurement values. In response, the receiving entity 220 collects and sends signed PCR value(s) and SML entries to the agent 214 of the sending entity 210 (step 304). The agent 214, or any other entity on the sending entity 210 that the agent 214 authorized, verifies if the receiving entity 220 is in a valid state, (i.e., if the receiving entity is trustworthy) using the PCR value(s) and the SML entries (step 306). If the sending entity 210 determines that the receiving entity 220 is trustworthy, the mobile agent 214 may be transferred from the sending entity 210 to the receiving entity 220 (step 320).

Optionally, the receiving entity 220 may evaluate the trustworthiness of the sending entity 210 and/or the mobile software agent 214 before receiving the mobile software agent 214. The receiving entity 220 may send a request for PCR value and SML entries for evaluating the state of the sending entity 210 and/or the state of the mobile software agent 214 (step 308). The state of the sending entity 210 is evaluated since the receiving entity 220 does not want to receive any code from an entity that is not in a correct state. The agent state is also evaluated since the agent might be in various possible states and the receiving entity 220 may be interested in receiving the agent only if it is in certain states. The state of the mobile software agent 214 is maintained either by the real platform TPM 212 on the sending entity 210 or by the virtual agent TPM 216 that is part of the mobile software agent 214. The receiving entity 220 may also request details about the software agent 214 itself including the digital certificate of the agent 214.

The sending entity 210 may either accept or reject the request. If the request is rejected by the sending entity 210, the receiving entity 220 may either accept or reject the agent transfer based on its own policies. If the sending entity 210 accepts the request, the agent 214 obtains signed PCR value(s) and SML entries from the sending entity 210, (i.e., the platform TPM 212) and from the agent TPM, (if it exists) (steps 310, 312). If the agent 214 contains a virtual agent TPM 216, the agent 214 uses its own AIK to sign the PCT value. The agent TPM 216 makes use of the functions in the real platform TPM 212 on the sending entity 210 to perform any cryptographic operations. The agent 214 also collects internal state information (step 314). The agent 214 sends the signed PCR value(s), SML entries and state information to the receiving entity 220 (step 316).

The receiving entity validates the integrity measurements of the sending entity 210 and/or the mobile software agent 214 (step 318). If the receiving entity 220 determines that the sending entity 210 and the mobile software agent 214 are in a trustworthy state, the mobile agent 214 is transferred from the sending entity 210 to the receiving entity 220 (step 320).

Figure 4:
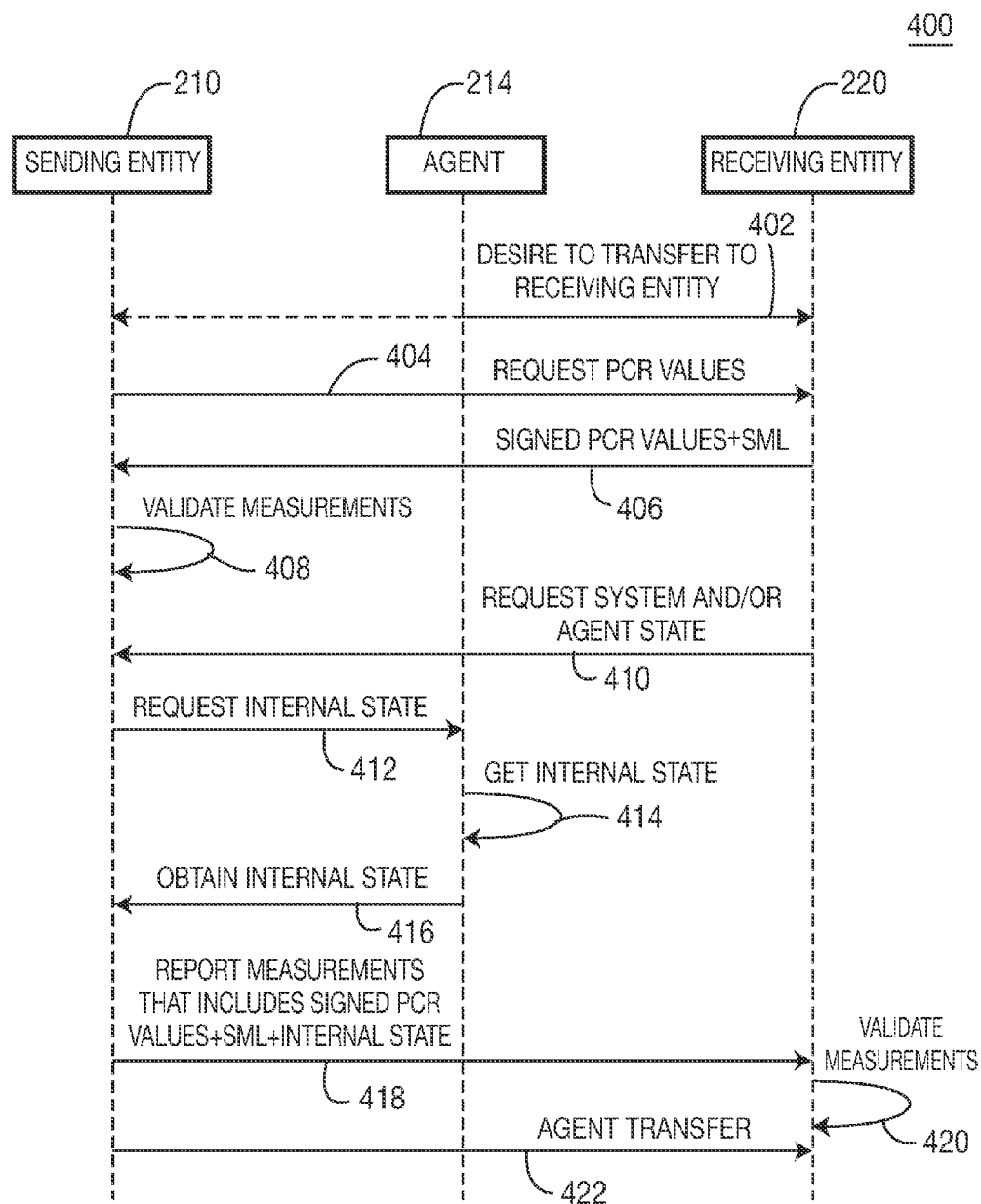
FIG. 4 is a signaling diagram of a trust establishment process in accordance with another embodiment of the present invention.

FIG. 4 is a signaling diagram of a trust establishment process 400 in accordance with another embodiment of the present invention. The establishment of the trusts may be handled and managed by the two platform entities, (i.e., the sending entity 210 and the receiving entity 220), rather than between the agent 214 on the sending entity 210 and the receiving entity 220. The sending entity 210 wishes to send its agent 214 to the receiving entity 220. The agent 214 sends signals to the sending entity 210 and the receiving entity 220 indicating a desire to transfer the agent 214 to the receiving entity 220 (step 402). The decision to transmit the agent 214 may be generated by the sending entity 210, a third party, the receiving agent 220 or any combination of these entities. Before the transfer of the agent 214, the sending entity 210 evaluates the trustworthiness of the receiving entity 220 preferably based on TCG attestation protocol. The sending entity 210 requests the receiving entity 220 for its signed PCR value(s) and SML entries (step 404). In response, the receiving entity 220 sends a signed PCR value(s) and SML entries to the sending entity 210 (step 406). The sending entity 210 verifies trustworthiness of the receiving entity 220 based on the signed PCT values and SML entries (step 408). If the sending entity 210 determines that the receiving entity 220 is trustworthy, the mobile agent 214 may be transferred from the sending entity 210 to the receiving entity 220 (step 422).

Optionally, the receiving entity 220 may evaluate the trustworthiness of the sending entity 210 and/or the mobile software agent 214 before receiving the mobile software agent 214. The receiving entity 220 may send a request for signed PCR value and SML entries of the sending entity 210 and/or the mobile software agent 214 (step 410). The sending entity 210 may either accept or reject the request. If the request is rejected by the sending entity 210, the receiving entity 220 may either accept or reject the agent transfer based on its own policies. If the sending entity 210 accepts the request, the sending entity 210 requests the agent 214 for its internal state information (step 412). The agent 214 collects the internal state information and sends it to the sending entity 210 (steps 414, 416). The sending entity 210 sends signed PCR value(s), SML entries and the agent internal state information to the receiving entity 220 (step 418).

The receiving entity 220 validates the integrity measurements of the sending entity 210 and/or the mobile software agent 214 (step 420). If the receiving entity 220 determines that the sending entity 210 and the mobile software agent 214 are in a trustworthy state, the mobile agent 214 is transferred from the sending entity 210 to the receiving entity 220 (step 422).

This embodiment has an advantage of potentially higher level of trust imparted on the procedures, because the receiving entity 220 may first evaluate the platform integrity of the sending entity 210, which is easier to verify and presumably more dependable in terms of veracity and verifiability since it is based on a platform TPM 212, before the receiving entity 220 even decides whether to accept the agent code, which may not be as reliably or easily verified of its integrity as the sending entity platform itself even if it has a virtual TPM 216. Therefore, rather than depending initiation procedures performed by the agent 214, of which integrity the receiving entity 220 eventually relies on, the receiving entity 220 may depend on the sending entity 210 which of course nonetheless has to prove its trustworthiness by sending its signed PCR value(s) and SML entries.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for performing trust evaluation of a mobile software agent on a trusted computing platform, the method comprising:

a sending entity evaluating a state of a receiving entity before sending a mobile software agent to the receiving entity; and the sending entity sending the mobile software agent to the receiving entity if it is determined that the receiving entity is trustworthy, wherein a virtual trusted platform module (TPM) is part of the mobile software agent, and wherein the virtual TPM is sent to the receiving entity as part of the mobile software agent if it is determined that the receiving entity is trustworthy.

2. The method of claim 1 further comprising:

the receiving entity evaluating a state of the sending entity; and the receiving entity receiving the mobile software agent if it is determined that the sending entity is trustworthy.

3. The method of claim 2 further comprising:
the receiving entity evaluating a state of the mobile software agent, whereby the receiving entity receives the mobile software agent if the mobile software agent is in a valid state.

4. The method of claim 3 wherein the state of the mobile software agent is maintained by a platform trusted platform module (TPM) on the sending entity.

5. The method of claim 3 wherein the state of the mobile software agent is maintained by the virtual TPM.

6. The method of claim 3 wherein the evaluation of the trustworthiness of at least one of the receiving entity and the sending entity is performed between the mobile software agent and the receiving entity.

7. The method of claim 3 wherein the evaluation of the trustworthiness of at least one of the receiving entity and the sending entity is performed between the sending entity and the receiving entity.

8. The method of claim 3 wherein the evaluation of the trustworthiness of at least one of the receiving entity and the sending entity is performed based on trusted computing group (TCG) attestation protocol.

9. The method of claim 2 further comprising:
the sending entity sending details of the mobile software agent, whereby the receiving entity receives the mobile software agent based on the details of the mobile software agent.

10. The method of claim 9 wherein the details of the mobile software agent include a digital certificate of the mobile software agent.

11. The method of claim 1 wherein the virtual TPM of the mobile software agent is tied to an identity of the mobile software agent.

12. A system for performing trust evaluation of a mobile software agent on a trusted computing platform, the system comprising:
a receiving entity; and
a sending entity including a mobile software agent and a platform trusted platform module (TPM) and configured to evaluate a state of the receiving entity and send the software mobile agent to the receiving entity after it is determined that the state of the receiving entity is trustworthy, wherein the mobile software agent includes a virtual trusted platform module (TPM), and wherein the virtual TPM is sent to the receiving entity as part of the mobile software agent if it is determined that the receiving entity is trustworthy.

13. The system of claim 12 wherein the receiving entity is configured to evaluate a state of the sending entity and receive the mobile software agent if the state of the sending entity is trustworthy.

14. The system of claim 13 wherein the receiving entity is configured to evaluate a state of the mobile software agent, whereby the receiving entity receives the mobile software agent if the state of the mobile software is a valid state.

15. The system of claim 14 wherein the state of the mobile software agent is maintained by the platform TPM on the sending entity.

16. The system of claim 14 wherein the state of the mobile software agent is maintained by the virtual TPM.

17. The system of claim 16 wherein the virtual TPM of the mobile software agent is tied to an identity of the mobile software agent.

18. The system of claim 14 wherein the evaluation of the trustworthiness of at least one of the receiving entity and the sending entity is performed between the mobile software agent and the receiving entity.

19. The system of claim 14 wherein the evaluation of the trustworthiness of at least one of the receiving entity and the sending entity is performed between the sending entity and the receiving entity.

20. The system of claim 14 wherein the evaluation of the trustworthiness of at least one of the receiving entity and the sending entity is performed based on trusted computing group (TCG) attestation protocol.

21. The system of claim 13 wherein the sending entity is configured to send details of the mobile software agent, whereby the receiving entity receives the mobile software agent based on the details of the mobile software agent.

22. The system of claim 21 wherein the details of the mobile software agent includes a digital certificate of the mobile software agent.

23. An apparatus for performing trust evaluation of a mobile software agent on a trusted computing platform, the apparatus comprising:
a mobile software agent including a virtual trusted platform module (TPM) which is tied to an identity of the mobile software agent; and
a platform TPM;
wherein the virtual TPM is sent to a receiving entity as part of the mobile software agent if it is determined that the receiving entity is trustworthy.

24. The apparatus of claim 23 wherein the mobile software agent is configured to evaluate a state of the receiving entity, wherein the state relates to trustworthiness of the receiving entity.

25. The apparatus of claim 23 further comprising:
means for evaluating a state of the receiving entity, wherein the state relates to trustworthiness of the receiving entity.

26. A method for performing trust evaluation of a mobile software agent on a trusted computing platform, the method comprising:
a sending entity sending a first request for a platform configuration register (PCR) value and stored measurement log (SML) entries to a receiving entity before sending a mobile software agent to the receiving entity;
the receiving entity sending a signed PCR value and SML entries to the sending entity;
the sending entity verifying integrity of the receiving entity based on the signed PCR value and the SML entries received from the receiving entity; and
the sending entity sending the mobile software agent to the receiving entity if integrity of the receiving entity is verified, wherein a virtual trusted platform module (TPM) is part of the mobile software agent, and wherein the virtual TPM is sent to the receiving entity as part of the mobile software agent if it is determined that the receiving entity is trustworthy.

27. The method of claim 26 further comprising:
the receiving entity sending a second request for a PCR value and SML entries to the sending entity;
the sending entity sending a signed PCR value and SML entries to the receiving entity;
the receiving entity verifying integrity of the sending entity based on the signed PCR value and the SML entries received from the sending entity; and
the receiving entity receiving the mobile software agent from the sending entity if integrity of the sending entity is verified.

28. The method of claim 27 further comprising:
the receiving entity requesting state information of the mobile software agent to the sending entity;
the receiving entity receiving agent state information from the sending entity; and the receiving entity verifying a state of the mobile software agent, whereby the receiving entity receives the mobile software agent if the mobile software agent is in a valid state.

29. The method of claim 28 wherein the state of the mobile software agent is maintained by a platform trusted platform module (TPM) on the sending entity.

30. The method of claim 28 wherein the state of the mobile software agent is maintained by the virtual TPM.

31. The method of claim 26 wherein the virtual TPM of the mobile software agent is tied to an identity of the mobile software agent.

32. The method of claim 26 wherein the signed PCR value is signed by using an attestation identity key of the virtual TPM.

33. A method for performing trust evaluation of a mobile software agent on a trusted computing platform, the method comprising:
a mobile software agent residing on a sending entity sending a first request for a platform configuration register (PCR) value and stored measurement log (SML) entries to a receiving entity before the mobile software agent is transferred to the receiving entity;
the receiving entity sending a signed PCR value and SML entries to the mobile software agent;
the mobile software agent verifying integrity of the receiving entity based on the signed PCR value and the SML entries received from the receiving entity; and
the sending entity sending the mobile software agent to the receiving entity if integrity of the receiving entity is verified, wherein a virtual trusted platform module (TPM) is part of the mobile software agent, and wherein the virtual TPM is sent to the receiving entity as part of the mobile software agent if it is determined that the receiving entity is trustworthy.

34. The method of claim 33 further comprising:
the receiving entity sending a second request for a PCR value and SML entries to the mobile software agent;
the mobile software agent obtaining a signed PCR value and SML entries from the sending entity;
the mobile software agent sending the signed PCR value and SML entries to the receiving entity;
the receiving entity verifying integrity of the sending entity based on the signed PCR value and the SML entries received from the mobile software agent; and
the receiving entity receiving the mobile software agent from the sending entity if integrity of the sending entity is verified.

35. The method of claim 34 further comprising:
the receiving entity requesting state information of the mobile software agent to the mobile software agent;
the receiving entity receiving agent state information from the mobile software agent; and
the receiving entity verifying a state of the mobile software agent, whereby the receiving entity receives the mobile software agent if the mobile software agent is in a valid state.

36. The method of claim 35 wherein the state of the mobile software agent is maintained by a platform trusted platform module (TPM) on the sending entity.

37. The method of claim 35 wherein the state of the mobile software agent is maintained by the virtual TPM.

38. The method of claim 37 wherein the virtual TPM of the mobile software agent is tied to an identity of the mobile software agent.

39. The method of claim 37 wherein the signed PCR value is signed by using an attestation identity key of the virtual TPM.

* * * * *